Jan. 26, 1932. R. C. ANGELL 1,843,076
ART OF CONTINUOUSLY FABRICATING FLEXIBLE SHAFTING
Filed Aug. 3, 1931 2 Sheets-Sheet 2
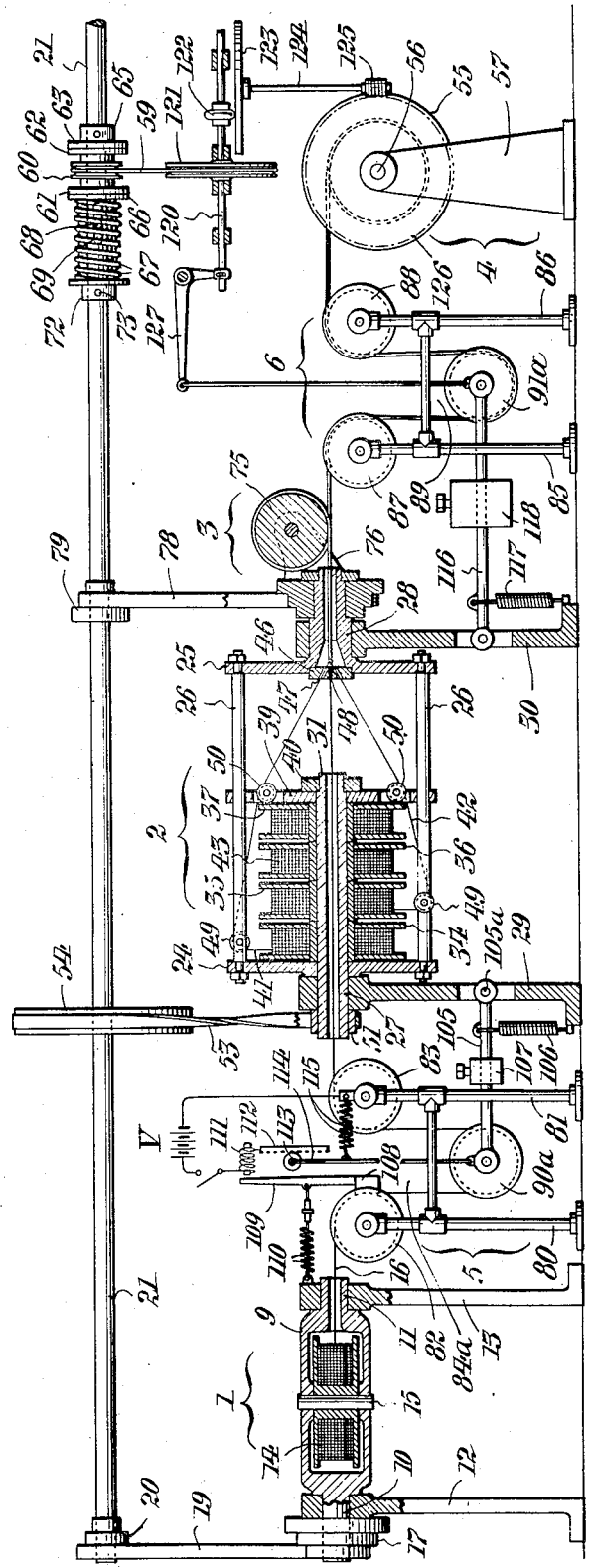
INVENTOR:
Robert C. Angell,
BY
ATTORNEYS.

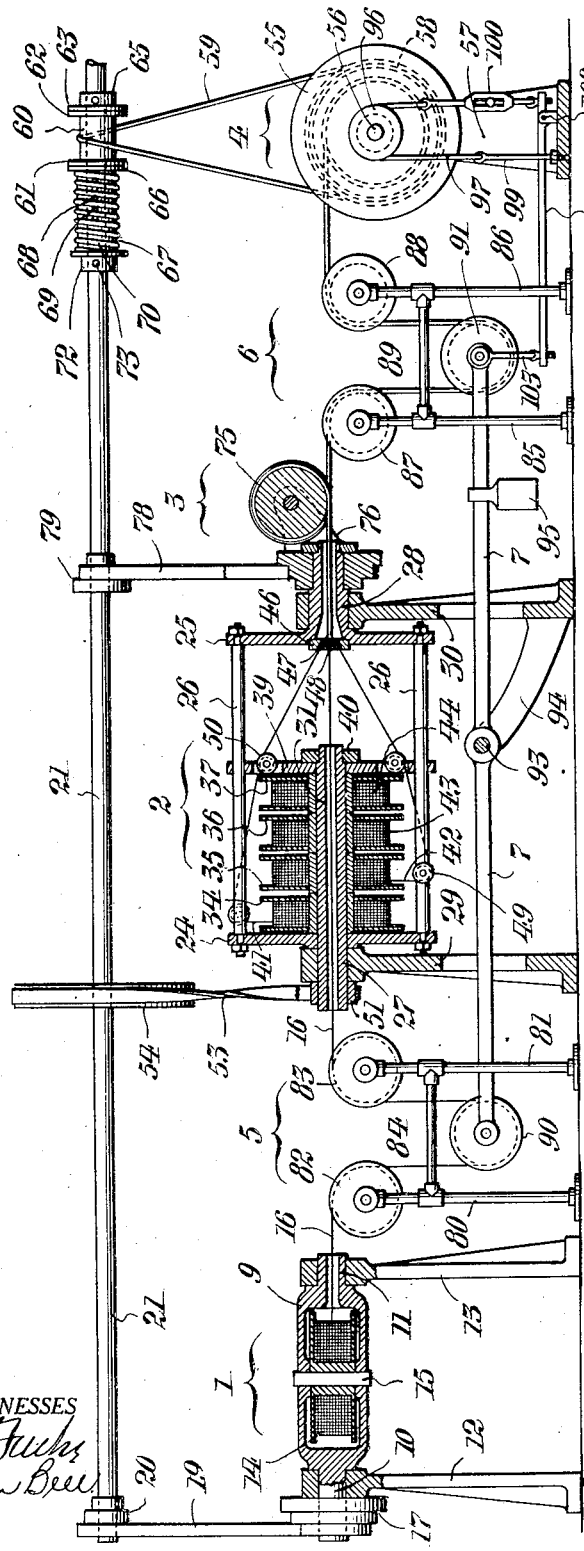

Patented Jan. 26, 1932

1,843,076

UNITED STATES PATENT OFFICE

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA

ART OF CONTINUOUSLY FABRICATING FLEXIBLE SHAFTING

Application filed August 3, 1931. Serial No. 554,690.

My invention relates particularly to the manufacture of flexible shafts formed of a plurality of wire strands coiled or wound around a central core, and is especially directed to a procedure whereby the progressive movement of the product being fabricated is so controlled as to obtain a finished shaft which has a smooth and substantially uniform surface arrangement and interspacial relationship of the said strands, and is consequently one around which another succeeding layer can be more easily laid.

It is well known to those skilled in this art that all wire which is commercially available for the manufacture of flexible shafting has a considerable variation in different parts of its length, both as to size and other physical characteristics. For example, the total variation in size frequently amounts to 7% or more of the rated gauge dimensions (e. g. to ± 0.0005" in a wire of .013", normal diameter). It will be obvious that irregularities in the material introduce difficulties in the uniform winding of the helical layers of wire on the core body, and tend to produce differences in the uniformity, or in the visual appearance of the spacing of successive turns of the helically disposed layers. These difficulties are due in part to the variations in frictional resistance to the movement of a wire through the winding mechanism; in part to the changes in the force required to bend or coil different portions of such a wire around a central core or underlying body; and in part to the changes in the force which is required to draw the assembled core and overlying helical layer of wire through the machine.

One of the principal objects of my invention is to provide a process or method for the manufacture of flexible shafting in continuous lengths which will compensate for any inequalities or irregularities of the character above mentioned, by subjecting the shaft to such a tension at the region of fabrication as to effect the laying of the coiled strands on the core in uniformly spaced relation; i. e. in such relation that the interproximal separation, or interspacial distance between the adjacent or contiguous wires of the helically wound layer, is substantially constant and uniform.

Other objects of my invention are to provide a flexible shaft fabricating machine, with drawing-out mechanism having controlling or driving means which can be so actuated as to vary the amount of pull developed by said drawing-out mechanism, in accordance with any variation of the forces tending to change the progressive movement of said shaft.

Specifically stated, the procedure hereinafter described comprises, the continuous delivery of a core body, from suitable pay-out mechanism, to a winding mechanism in which a layer of superimposed strands of wire are wound on the said core; the continuous withdrawal of the shaft body thus formed from the said winding mechanism; and the control of the forces acting upon the composite elements at regions embracing or spanning the winding zone whereby a uniform interproximate spacing of the wires in the wound layer is obtained. This result is accomplished when the forces last referred to are so regulated that the difference between the tension or back pull on the core body—as it passes to the winding mechanism—and the tension or draft on the composite shaft body—as it is drawn from the said mechanism—is a constant or uniform difference.

The accompanying drawings illustrate various alternative forms of apparatus which may be utilized in connection with my present invention. In these drawings Fig. I is a vertical longitudinal sectional view of one such form of apparatus, (certain parts being shown in elevation for convenience of illustration);

Fig. II is a plan view of those parts of the apparatus which cooperate to apply the forces that are necessary to effect the desired progressive movement of the shaft at the region of fabrication;

Fig. III is another sectional elevation—similar to Fig. I—of a second form of machine adapted to the practice of my improvements;

Fig. IV is a side view of a tension control mechanism which may be used in place of that shown at the left of Fig. III; and Fig. V is an enlarged view of a portion of the fabricated shaft body which is produced by my process.

The machine shown in Figs. I and II may preferably be composed of separate units cooperatively associated, and comprising, a core-dispensing or pay-out carrier 1, a revolvable winding or laying-on mechanism 2, a recoil or untwisting mechanism 3, a take-up or spooling mechanism 4, and a compensating-tension-control means which comprises the shaft-looping frames, 5 and 6, and the rocking or walking beam 7, that is cooperatively connected with said take-up or spooling mechanism to effect the desired progressive movement of said shaft at the region of fabrication.

The core-dispensing carrier, 1, comprises the flier-frame 9, which is provided with trunnions 10 and 11 that are rotatably mounted in the standards 12 and 13; and a core-carrying spool 14, which is mounted to rotate in said flier-frame 9 on the shaft cross 15, (whose axis is transverse to the axis of rotation of said flier-frame 9), and which is arranged to pay out the core 16 through the hollow trunnion 11.

Rotation of the flier-frame 9 may be effected in any convenient manner, and I have chosen to illustrate a simple means, which comprises the step pulley 17 that is secured on the trunnion 10, and is connected, by the belt 19, with a similar stepped pulley 20 on the counter-shaft 21.

The winding mechanism comprises the strand bobbin frame having end disks, 24 and 25, which are connected by the spacing bars 26, and which are respectively provided with hollow trunnions 27 and 28 mounted for rotation in the standards 29 and 30; the trunnion 27 being extended inwardly to form the hollow stud 31 upon which the bobbins 34, 35, 36 and 37 may be rotatably mounted, and removably held in position by the disk 39, which is retained on the stud 31 by the retaining nut 40.

Said bobbins 34, 35, 36 and 37 are respectively arranged to deliver strands 41, 42, 43 and 44 to the strand-winding die 46, that is suitably mounted in the disk 25 and is provided with suitable apertures 47, through which said strands are arranged to pass, and with a central aperture 48 for the core body 16, which is passed through the hollow trunnion 27, the hollow stud 31, and the hollow trunnion 28, and about which said strands 41, 42, 43 and 44 are coiled by the rotation of the strand bobbin frame and its die 46. The strands 41, 42, 43 and 44 are respectively directed to the die 46 by passing over suitable guide rollers or pulleys 49, preferably carried by the spacing bars 26, and over the guide rollers or pulleys 50, which may be conveniently carried by the disk 39.

The rotation of the strand bobbin frame may be conveniently effected by the pulley 51 which is mounted on the trunnion 27 and connected by the driving-belt 53 with the pulley 54 on the counter-shaft 21; the pulley 54 being of much greater diameter than the pulley 51, so as to rotate the strand-bobbin frame at a comparatively high and substantially constant rate of speed.

The longitudinal progressive movement of the fabricated shaft, and its component parts, is effected by the take-up mechanism, comprising the take-up reel or spool 55 having its shaft 56 mounted for rotation in the standards 57 and provided with the pulley 58 connected by the belt 59 with the pulley 60 which is loosely mounted for rotation on the counter-shaft, 21, and is provided with friction flanges 61 and 62.

The flange 62 is arranged to frictionally engage the flange 63 of the flanged collar 65 which is pinned to rotate with the counter-shaft 21, and the flange 61 is arranged to be engaged by the flange 66 of the flanged collar 67 which also rotates with the counter-shaft 21, but which by cooperation of the pin 68 and slot 69 may move axially thereon, being forced against the flange 61 by the spring 70 which is interposed between said flange 66 and the flanged collar 72 secured to the counter-shaft 21 by the pin 73.

If it be desired to twist the shaft, after it leaves the winding head, the twisting or recoil drum 75, having the shaft looped therearound, may be conveniently interposed between the strand-feeding and winding mechanism, and the take-up mechanism; said drum 75 being mounted for rotation in the frame 76 that is rotatably supported on the hollow trunnion 28, and is adapted to be rotated about the axis of the shaft being fabricated, by the belt 78, and the stepped pulley 79 on the counter-shaft 21.

When the recoil frame 76 is revolved in a direction opposite to that in which the winding head is rotating, a portion of the fabricated shaft lying between said recoil frame 76 and the take-up reel 55, is revolved in the same direction as that in which the recoil frame is moving. This rotation of the frame 76 twists the shaft body in a direction opposed to that of the winding of the outer layer, and this results in a definite predetermined torsion, per foot of length, in the core element. The revolution of the recoil frame also twists the outer helical layer of wire in a direction opposed to that in which it is applied to the core by the action of the winding mechanism; and this, in turn, enlarges the diameter of the helical layer, and thereby relieves the pressure contact between the said layer and the underlying body, with a consequent reduction of the internal friction between the superimposed elements of the shaft when the latter is used as a flexible driving member.

The looping frame 5, of the compensating-tension-controlling means, is disposed between the core-dispensing mechanism and the strand-feeding and winding mechanism, and comprises the standards 80 and 81, which respectively support the spaced pulleys, 82 and 83, over which the core body is formed into a bight 84; and the looping frame 6, which forms another part of this same means, is disposed between the strand-feeding and winding mechanism, and the take-up mechanism, and comprises the standards 85 and 86, that carry the spaced pulleys 87 and 88 over which the fabricated shaft body is formed into a bight 89.

The bights 84 and 89, are engaged by the pulleys 90 and 91 disposed at the opposite ends of the walking beam 7, which is pivoted at 93 to rock on the bracket 94 extending from the standard 30, and which is provided with the weight 95 longitudinally adjustable thereon to vary the force required to draw the shaft through the fabricating mechanism and thereby obtain the desired uniform difference in tension, and the resultant uniformity of the spacing of the strands being wound thereon.

The take-up mechanism is provided with the friction brake-drum 96, about which a friction brake-band 97 is coiled; the said brake-band having one end connected to the base of the standards 57 by the screw-eye 99, and having the other end connected, by means of the turnbuckle 100, to one end of the lever 101, which is pivoted at 102 on the base of the standard 57. The other end of this lever 101 is connected, by the link 103, to the end of the beam 7, on which the pulley 91 is carried. When the pulley 91 is raised, the outer, or right hand end of the lever 101, is depressed and the brake-band 97 is drawn more closely into engagement with the drum 96, thereby increasing the frictional resistance to the rotation of the take-up reel 55, and correspondingly diminishing the effective driving action of the flanged collars 63 and 66 on the friction disks 61—62. This reduction in driving effect on the reel 55 will result in a corresponding decrease of the draft, or axial movement, of the shaft which is being wound up on the spool 55. When the pulley 91 falls, the braking action of the band 97 on the drum 96 is diminished, and the effective driving action of the frictionally engaged elements 61—63, and 62—66, and the resultant axial pull on the product being spooled, is correspondingly increased.

It will be apparent that any variation in the frictional resistance to the movement of the pay-out spool 14, which tends to vary the tension in the core element 16, that is being drawn therefrom, will cause the pulley 90 to rise or fall, and that this movement will produce a reciprocal depression or elevation of the pulley 91 at the opposite end of the rocking beam 7. It will also be apparent, from the preceding description, that this movement of the rocking beam will momentarily vary the draft or pull on the fabricated product as it passes to the take-up unit 4; and that this draft or pull is increased as and when the core tension is augmented, and vice versa. It is further obvious that under the normal and intended conditions of operation the forces acting on the opposite ends of the "walking" beam 7 are in equilibrium; and that the tension on the fabricated product, which passes around the pulley 91, must always exceed the tension in the core body, which passes around the pulley 90, by an amount sufficient to support the unbalanced component of the adjustable weight 95 on the beam 7. This difference in tension may be varied by positioning said weight at different distances from the pivot support 93 of the beam; but for any one setting the said difference will and must remain constant; and the shaft will be progressed through the machine at such a rate of speed as to establish and maintain a substantially fixed and uniform interproximal spacing between the adjoining or contiguous sides of the successive wires as they are applied to, and wound upon, the core body by a uniform rate of rotation of the winding unit 2.

The apparatus shown in Fig. III differs from that illustrated in Figs. I and II, only in respect to the details of the compensating and tension controlling instrumentalities which are utilized to establish and maintain the desired and necessary relation between the tension on different portions of the shaft elements. In this construction, (Fig. III) the pulley 90a, which engages with the loop or bight 84a of the core body, is supported on a swinging guide arm 105, that is pivoted, at 105a, on the adjacent pedestal 29 of the winding unit, and is drawn downward by the combined action of a spring 106 and an adjustable weight 107. The guide pulley 82 is, in this case, provided with a brake shoe 108 which is carried on a swinging arm 109, and is held in engagement with the pulley 82 by an adjustable tension spring 110. The upper end of the brake arm 109 is attached to the movable armature or core piece, of an electromagnet 111, whose exciting coil is supplied with current from any suitable source such as the battery V. The electric circuit from the battery to the coil contains a rheostat or resistance element 112, that is provided with a movable contact 113 which is connected to the pulley 90a by means of the rod 114, and is held in light pressure engagement with the rheostat terminals by a spring 115, that also serves as an electrical connection between one side of the battery V and the contact 113.

The looped portion of the core body, which is engaged by the pulley 90a—and the connected section of the said core which passes over the pulley 83 to the winding mechanism 2—is always subjected to a tension or back pull which is fixed and determined by the pull of the spring 106 and the adjustment of the weight 107 on the arm 105, and is not sensibly affected by the rate at which the core is drawn from the pay-off reel 14. But this rate of delivery may be affected by variations in the frictional resistance to the rotation of the spool 14 on its own axis; and such variations will result in a rise or fall of the tensioning pulley 90a which might exceed the permissible range of such movement if the tensioning device was not also capable of acting as a compensating means. This compensation function is performed by the interconnected brake control elements, 108 to 115 inclusive, which act to reduce the braking action on the pulley 82—and thus permit the core body to be drawn more rapidly from the reel 14—when the pulley 90a is raised; and to correspondingly increase this braking action when the said pulley moves downward. This compensating tension-controlling mechanism therefore performs the joint functions of establishing and maintaining a predetermined and constant back pull on the core body as it passes to the winding mechanism, and of also keeping the range of movement of the tension applying pulley 90a within allowable limits.

The mechanism which determines and controls the tension or draft that is applied to the fabricated shaft body which is delivered from the winding mechanism comprises—as shown in Fig. III—the pulley 91a which is rotatably mounted on a swinging arm 116, and is held in pressure engagement with the loop or bight 89 of the fabricated product by the spring 117 and the adjustable weight 118. The tension imposed on this portion of the shaft is predetermined and maintained uniform by the setting of the spring 117 and of the weight 118; and is not sensibly varied by the rate at which the product is wound up on the take-up spool 96. But if this rate varies the pulley 91a will rise or fall; and in order to prevent this movement exceeding that which is permitted by mechanical considerations the arm 116 is connected to a compensating or speed controlling mechanism, which is adapted to automatically vary the rate of revolution of the take-up spool when the pulley 91a moves away from its normal intermediate position. As shown in Fig. III, this result is accomplished by the use of a jack shaft 120 which is driven from the pulley 60 on the countershaft 21, by means of the belt and sheave elements 59 and 121. The jack shaft 120 carries a driving roll, 122, which engages with a friction disk 123 that is mounted on a vertical shaft 124, and is operatively connected to the take-up spool 55 by means of the worm and worm wheel elements 125 and 126. The jack shaft 120 is provided with a longitudinal spline, that is slidably engaged by a key in the hub of the pulley 121, and can therefore be moved axially, to vary the point of driving contact between the roll 122 and the disk 123, and thus alter the speed of rotation of the takeup spool 55. This axial movement is effected and controlled by connecting the end of the lever 116 with one arm of a bell crank lever 127, and coupling the other arm of the said lever to the adjacent extremity of the jack shaft 120; the arrangement being such that when the pulley 91a begins to rise the roll 122 is moved away from the center of the disk 123 and the rate of pull on the product which passes to the take-up mechanism is decreased; and vice versa.

It is obvious, that the cooperative action and effect of the two tension controlling and compensating mechanisms last described—one of which engages with the core body on the entrance side of the winding mechanism and the other of which is engaged with the fabricated product on the exit side of the said mechanism—is the same as that of the interconnected walking beam assembly of the first described apparatus; and that this cooperative action results in the establishment of a predetermined and uniform difference between the tensions imposed on the shaft elements on opposite sides of the point at which the helical coils of wire are applied to the moving core body, and further results in the winding of these coils with a uniform interproximal spacing.

Fig. IV illustrates another form of compensating-tension-controlling mechanism, for regulating the delivery of the core body to the winding mechanism under a constant or uniform back pull thereon. In this arrangement the core body 16, which is drawn from the pay-off reel 14b, is passed one or more times around the drum pulley, 82b, then down around the tension control pulley 90b, and then up, around the direction pulley 83, to the winding mechanism 2. The pulley 82b is provided with a worm wheel 130, which is engaged by the worm 131 on the shaft 132; and the latter is frictionally driven, from the counter-shaft 21, by means of the belt 133, the pulley 134, the jack shaft 135, the roll 136 and the friction disk 137. The driving roll 136 is connected to the jack shaft 135 by a sliding key and spline connection, and its position on the said shaft is controlled by the bell crank lever 138, that is connected to the support of the tension control pulley 90b by the tension rod 140. When the pulley 90b falls the roll 136 is moved away from the axis of the shaft 132 and the speed of revolution of the drum 82b is reduced—thereby momentarily decreasing the rate at which the core body is drawn from the pay-off reel 14b—and when the said pulley rises the reverse action takes place; thus keeping the tension applying members 90b—105b etc., in or near their intermediate position. As before the tension on the core wire, as it passes to the winding mechanism 2, is maintained at a definite predetermined value by the adjustment of the spring 106b, whose tension may be altered, as desired, by the manually operable hand wheel 107b.

The result of using any of the previously described mechanisms, in the manner described, is to establish and maintain a definite controllable difference between the tensions to which the core body and the fabricated shaft body are respectively subjected—as these elements enter and leave the winding mechanism—and thereby secure a desired uniform interproximal spacing between the contiguous or adjacent sides of the helically wound strand wires. This relationship between the strand wire elements of the fabricated shaft body is clearly shown in the enlarged illustration of Fig. V where C indicates the core body—which may be either a single straight wire, or, as here shown, a plurality of wire elements arranged in any desired relation—d, d, d, d, indicate the strand wires which are wound in parallel on the said core to form one layer element of the fabricated shaft body, and e indicates the uniform interproximal spacing between these helically wound strand wires.

I do not desire to limit my invention to the precise details of construction and arrangement as herein set forth, as it is obvious that various modifications may be made therein without departing from the essential features of my invention as defined in the appended claims.

Having thus described my invention, I claim:

1. An improvement in the art of fabricating flexible shafting in continuous lengths which comprises the winding of a helically disposed wire coil about a continuously progressing core body, and maintaining a constant difference between the tension applied to the core body and the tension applied to the assembled core body and its coil.

2. The process of fabricating flexible shafting in continuous lengths which consists in progressing a core body under a constantly regulated tension, winding thereupon a helical wire coil and thereupon progressing said core body with its coil under a constantly regulated tension greater by a fixed amount than the tension of the core body.

3. The process of fabricating flexible shafting in continuous lengths which consists in progressing a core body under a regulated tension, winding successive turns of wire coil thereabout, and progressing the core body with its superimposed coil under a tension so regulated as to maintain a constant differential between it and the tension under which the core body is progressed, whereby there is secured a uniform interproximal spacing between the adjacent sides of successive turns of the superimposed coil.

In testimony whereof, I have hereunto signed my name at Philadelphia, in the county of Philadelphia and State of Pennsylvania, this 29th day of July, 1931.

ROBERT C. ANGELL.